(12) United States Patent
Nishio

(10) Patent No.: US 6,979,923 B2
(45) Date of Patent: Dec. 27, 2005

(54) MOTOR HAVING DYNAMIC PRESSURE FLUID BEARING AND DISC DRIVE APPARATUS PROVIDED WITH THE MOTOR

(75) Inventor: Akira Nishio, Tokyo (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 10/965,886

(22) Filed: Oct. 18, 2004

(65) Prior Publication Data

US 2005/0088050 A1    Apr. 28, 2005

(30) Foreign Application Priority Data

Oct. 23, 2003    (JP)    .............................. 2003-362888

(51) Int. Cl.[7] .......................... H02K 5/16; H02K 7/00; F16C 32/00
(52) U.S. Cl. ...................... 310/90; 384/112; 384/114; 384/115; 384/121; 360/98.07; 360/99.08
(58) Field of Search ...................... 310/90; 360/98.07, 360/98.08, 99.07, 99.08, 99.12; 384/107, 384/111–115, 118, 121

(56) References Cited

U.S. PATENT DOCUMENTS

| 5,713,670 | A | * | 2/1998 | Goldowsky | ................. 384/115 |
| 6,005,748 | A | * | 12/1999 | Heine et al. | ............. 360/99.08 |
| 6,034,454 | A | * | 3/2000 | Ichiyama | ..................... 310/90 |
| 6,069,768 | A | * | 5/2000 | Heine et al. | ............. 360/99.08 |
| 6,137,650 | A | * | 10/2000 | Heine et al. | ............. 360/98.07 |
| 6,195,895 | B1 | * | 3/2001 | Wuester, Sr. et al. | .... 29/898.02 |
| 6,678,115 | B2 | * | 1/2004 | Khan | ...................... 360/99.08 |

FOREIGN PATENT DOCUMENTS

| JP | 58-200816 | * 11/1983 | .................. 310/90 |
| JP | 10-080091 | 3/1998 | |
| JP | 2003-125553 | 4/2003 | |

* cited by examiner

Primary Examiner—Tran Nguyen
(74) Attorney, Agent, or Firm—Connolly Bove Lodge & Hutz LLP

(57) ABSTRACT

A motor (100) having a dynamic pressure fluid bearing is composed of a hub (2), a rotor (4) provided with a shaft (7) of which one end portion is securely fastened by the hub (2) and another end portion is formed with a flange (8), and a stator (3) composed of a sleeve section (9) for axially sustaining the shaft (7) so as to be rotatable freely and a thrust plate (10) secured on the sleeve section (9) so as to confront with the flange (8), wherein the dynamic pressure fluid bearing is composed of a thrust dynamic pressure fluid bearing constituted by the flange (8) and the thrust plate (10), and wherein the shaft (7) is provided with a through hole (17) bored through the shaft (7) from the one end surface to the other end surface, and wherein the through hole (17) is formed in a shape having an opening to the other end surface of the shaft (7) by way of a funnel shaped section (17c) of which diameter gradually increases toward the other end surface of the shaft (7).

2 Claims, 3 Drawing Sheets

MOTOR HAVING DYNAMIC PRESSURE FLUID BEARING AND DISC DRIVE APPARATUS PROVIDED WITH THE MOTOR

BACKGROUND OF THE INVENTION

1. Field of the Invention

The present invention relates to a motor having a dynamic pressure fluid bearing and a disc drive apparatus provided with the motor.

2. Description of the Related Art

Higher reliability is required for a motor, which is utilized for a driving apparatus of a disc such as a magnetic disc so as to drive the disc rotatably. Particularly, along with increasing recording capacity of a disc, a motor having a dynamic pressure fluid bearing, which is advantageous to NRRO (Non-Repeatable Run-Out) in comparison with a bearing using a conventional ball bearing, enables to be used preferably for such a disc drive apparatus.

With respect to an example of a motor having a dynamic pressure fluid bearing (hereinafter referred to as just a motor), the Japanese Patent Application Laid-open Publication No. 10-80091/1998 discloses such a motor having a dynamic pressure fluid bearing.

The motor is composed of a shaft section and a sleeve section that is rotatable freely and relatively with respect to the shaft section. The shaft section is axially sustained by radial and thrust dynamic pressure fluid bearings.

Further, the shaft section is provided with a through hole for injecting lubrication fluid and maintaining it therein, wherein the through hole is bored through the shaft section from the top end surface to the bottom end surface.

However, in the above-mentioned motor, an amount of lubricant necessary for lubricating the dynamic pressure fluid bearing may fail to be maintained sufficiently when the amount of lubricant decreased due to exuding of the lubricant diachronically. Consequently, there existed a problem such that it was hard for life of the bearing to be maintained longer or stably.

Further, an inner wall surface of the through hole for injecting lubricant approximately intersects perpendicularly with a lower end surface of the shaft section. Therefore, in a process of manufacturing motors, when lubricant is injected into the through hole through an open hole provided in a top end portion of the through hole, air is easily led into the lubricant, and resulting in tending to remain bubbles in the lubricant.

Furthermore, in this configuration, the bubbles once let into the lubricant are blocked by a bottom end surface of the shaft section and hardly released from the lubricant to the outside of the shaft section through the through hole.

The remaining bubbles resulted in another problem such that the lubricant disabled to fulfil its performances sufficiently, and resulting in failing to ensure prescribed performances of the dynamic pressure fluid bearing, or that burning between the bearing and the shaft section easily occurred, and resulting in shortening the motor life.

Further, lubricant must be injected into the through hole so as to remain no bubble in the lubricant. Consequently, there existed a further problem such that an assembling work of motors was made difficult.

SUMMARY OF THE INVENTION

Accordingly, in consideration of the above-mentioned problems of the prior arts, an object of the present invention is to provide a motor having a dynamic pressure fluid bearing and a disc drive apparatus provided with the motor, wherein the motor is easy to assemble, maintains an amount of lubricant sufficiently, is long in life, and ensures prescribed performances stably for a long period of time.

In order to achieve the above object, the present invention provides, according to an aspect thereof, a motor having a dynamic pressure fluid bearing comprising: a hub; a rotor provided with a shaft of which one end portion is securely fastened by the hub and another end portion is formed with a flange; and a stator composed of a sleeve for axially sustaining the shaft so as to be rotatable freely and a thrust plate secured on the sleeve so as to confront with the flange, wherein the dynamic pressure fluid bearing is composed of a thrust dynamic pressure fluid bearing constituted by the flange and the thrust plate, and wherein the shaft is provided with a through hole that is bored through the shaft from the one end surface to the other end surface, and wherein the through hole is formed in a shape having an opening to the other end surface of the shaft by way of a funnel shaped section of which diameter gradually increases toward the other end surface of the shaft.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
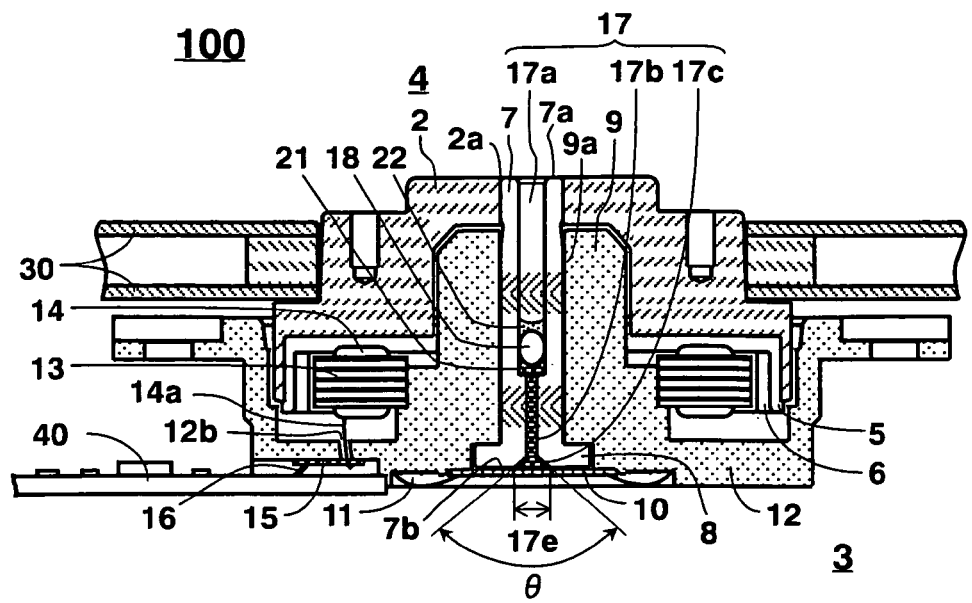
FIG. 1 is a cross sectional view of a motor having a dynamic pressure fluid bearing according to a first embodiment of the present invention.

FIG. 1 is a cross sectional view of a motor having a dynamic pressure fluid bearing according to a first embodiment of the present invention.

Figure 2A:
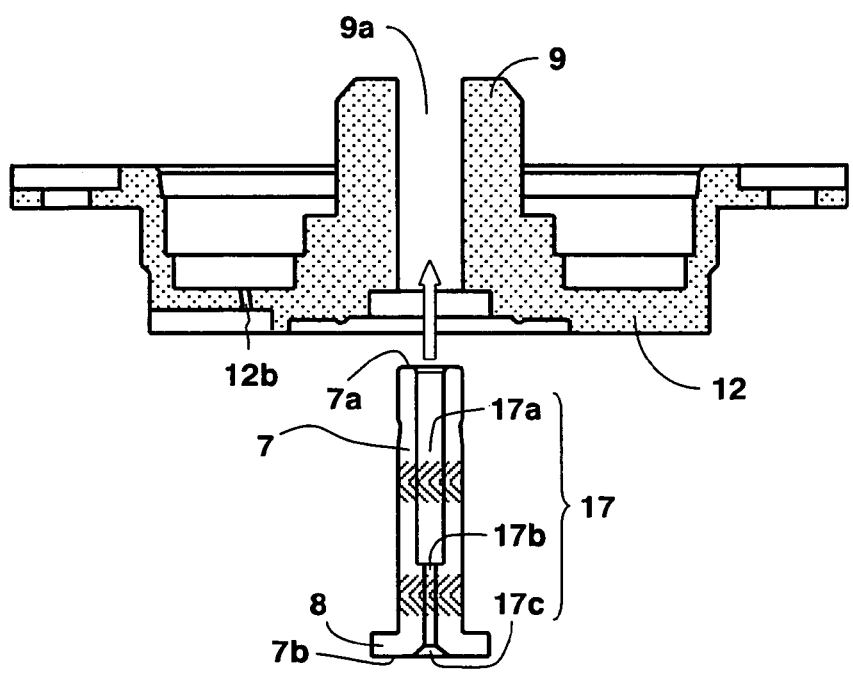
FIG. 2(a) exhibits a first step of an assembling process of the motor having the dynamic pressure fluid bearing shown in FIG. 1, wherein a shaft is inserted into a hole of a sleeve section.
Figure 2B:
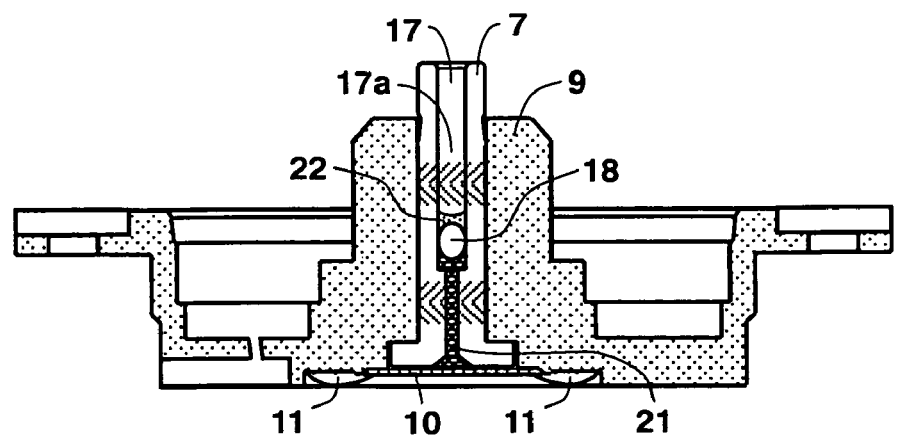
FIG. 2(b) exhibits a second step of the assembling process of the motor, wherein lubricant is injected into a through hole of the shaft mounted in the sleeve section.
Figure 2C:
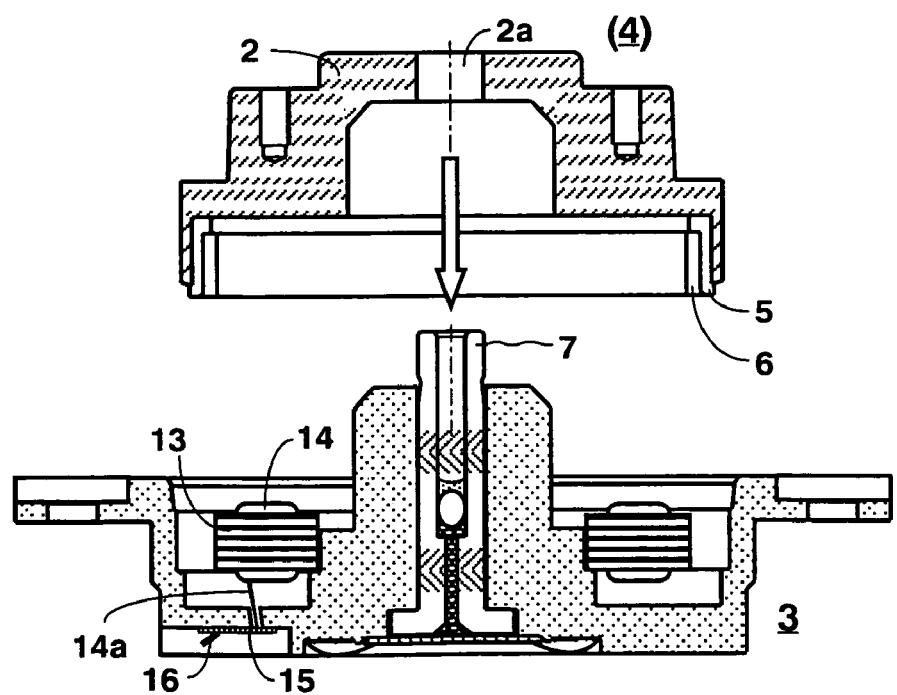
FIG. 2(c) exhibits a third step of the assembling process of the motor, wherein a hub is mounted on a stator.

FIGS. 2(a) to 2(c) are drawings for explaining an assembling process of the motor having the dynamic pressure fluid bearing shown in FIG. 1.

In FIG. 1, a motor 100 having a dynamic pressure fluid bearing is composed of a stator 3 and a rotor 4. The rotor 4 is further composed of a hub 2, a rotor yoke 5 that is fixed inside a hollow portion provided on a bottom of the hub 2, a magnet 6 that is securely adhered inside the rotor yoke 5, and a shaft 7 of which one end portion is force-fitted into a hole 2a provided in a middle of the hub 2. Finally, a disc 30 such as a recording medium in disciform and a magnetic disc is securely mounted on the hub 2 of the motor 100.

Further, the rotor 4 is formed by cutting ingot aluminum.

In this connection, the rotor yoke 5 is formed by iron, and nickel plating is conducted on a surface of the rotor yoke 5.

Furthermore, electrodeposition coating is applied on a surface of the magnet 6.

More, the shaft 7 is made by aluminum, zinc, or like, and the other end portion of the shaft 7 opposite to the end portion force-fitted into the hub 2 is formed with a flange 8 in one piece.

On the other hand, the stator 3 is provided with a sleeve section 9 having a hole 9a for axially sustaining the shaft 7.

Further, the stator 3 is composed of a motor base 12 that is formed together with the sleeve section 9 in one piece, a core 13 that is affixed on an outer circumferential surface of the sleeve section 9, wherein a coil 14 is wound around the core 13, and a thrust plate 10 that is affixed on a lower end portion of the hole 9a by glue 11 so as to seal a bottom opening of the hole 9a.

In this connection, the motor base 12 is formed by aluminum diecasting, and a cutting process is applied on predetermined portions thereof.

Further, the core 13 is made by laminating a thin plate of silicon steel and insulation coating is applied on the surface of the core 13 by a coating method such as the electrodeposition coating method and the powder coating method.

Furthermore, the thrust plate 10 is made by a stainless material.

A lead wire 14a of the coil 14 is passed through a through hole 12b, which is provided on the motor base 12, and electrically connected to a wiring pattern that is formed on a flexible printed circuit board (hereinafter referred to as FPC) 15, which is firmly mounted on a bottom of the motor base 12, by soldering.

The wiring pattern of the FPC 15 is electrically connected to a driving circuit 40 to be provided in a disc drive apparatus through a connector 16. By turning on electricity supplied to the driving circuit 40, the motor 100 is activated, and resulting in rotating the rotor 4 with respect to the stator 3.

Top and bottom end surfaces of the flange 8 are formed with a thrust dynamic pressure groove (not shown) such as herringbone and Rayleigh step so as to generate dynamic pressure. The thrust dynamic pressure groove enables to be formed by a processing method such as etching and stamping.

A gap between a bottom end surface 7b of the flange 8 and the top surface of the thrust plate 10 is filled with lubricant (oil) 21 to be detailed later, wherein the lubricant 21 is hermetically sealed in the gap approximately.

Accordingly, a thrust dynamic pressure fluid bearing is constituted. The thrust dynamic pressure fluid bearing sustains the rotor 4 in the thrust direction by dynamic pressure that is accompanied by rotative motion of the rotor 4 on the basis of the sleeve section 9, the thrust dynamic pressure groove, the thrust plate 10, and the lubricant 21.

On the other hand, an outer circumferential area of the shaft 7 or an inner wall surface of the hole 9a in the sleeve section 9 is formed with a radial dynamic pressure groove such as herringbone and Rayleigh step, which is provided for generating dynamic pressure in the radial direction, as shown by herringbone patterns in FIG. 1. The radial dynamic pressure groove also enables to be formed by the processing method such as etching and stamping.

A gap between the outer circumferential area of the shaft 7 and the inner wall surface of the hole 9a of the sleeve section 9 is filled with the lubricant (oil) 21 that is hermetically sealed therein approximately.

Accordingly, a radial dynamic pressure fluid bearing is constituted. The radial dynamic pressure fluid bearing sustains the rotor 4 in the radial direction by dynamic pressure that is accompanied by rotative motion of the dynamic pressure groove and the rotor 4 on the basis of the lubricant 21, the radial dynamic pressure groove, and either the shaft 7 or the sleeve section 9 that confronts with the radial dynamic pressure groove.

In order to inject and maintain the lubricant 21, the shaft 7 is formed with a through hole 17 in the axial direction. The through hole 17 is formed with a large diameter section 17a having a first diameter in a top end portion opposite to a bottom end portion formed with the flange 8 by way of boring in a top end surface 7a of the shaft 7. On the other hand, the other end portion of the shaft 7 formed with the flange 8 is provided with a small diameter section 17b having a second diameter that is smaller than the first diameter.

Further, the bottom end surface 7b of the shaft 7 or the flange 8 is formed with a tapered opening section (funnel shaped section) 17c of which opening mouth opens in funnel shape approximately.

With respect to dimensions of each section, exemplary dimensions are as follows: an outer diameter of the shaft 7 is 4.0 mm ($\phi$ 4.0), the first diameter is $\phi$ 2.0, the second diameter is $\phi$ 1.0, an opening mouth diameter 17e of the tapered opening section 17c is $\phi$ 3.0, and an angle $\theta$ of the tapered opening is 120 degrees.

A prescribed amount of the lubricant 21 is injected into the through hole 17 as much as a fluid level of the lubricant 21 reaches to the large diameter section 17a. The lubricant 21 injected into the through hole 17 is supplied as lubricant for lubricating the above-mentioned radial and thrust dynamic pressure fluid bearings.

Further, the lubricant 21 is sealed by an elastic member 18 that is force-fitted into the large diameter section 17a.

Furthermore, in order to completely seal a gap between a periphery of the elastic member 18 and an inner wall surface of the large diameter section 17a, binding agent (sealant) 22 is injected on the top surface of the elastic member 18 press-fitted in the large diameter hole 17a of the through hole 17. Consequently, the elastic member 18 is adhered and fastened to the inner wall surface of the large diameter section 17a by the binding agent 22, and resulting in sealing the lubricant 21 in the through hole 17 perfectly.

In this connection, a spherical elastomeric material, for example, enables to be used for the elastic member 18. However, it should be understood that a material for the elastic member 18 is not limited to the elastomeric material.

The lubricant 21 tends to expand or shrink by change of ambient temperature. However, elasticity of the elastic member 18 appropriately absorbs expansion or shrinkage of the lubricant 21, so that the lubricant 21 enables to be sealed securely and stably in the through hole 17 for a long period of time without being affected by surroundings.

With referring to FIGS. 2(*a*) to 2(*c*), an outline of an assembling process of the motor 100 having the dynamic pressure fluid bearing that is constituted as mentioned above is explained next.

FIG. 2(*a*) exhibits a first step of an assembling process of the motor having the dynamic pressure fluid bearing shown in FIG. 1, wherein the shaft is inserted into the hole of the sleeve section.

FIG. 2(*b*) exhibits a second step of the assembling process of the motor, wherein lubricant is injected into the through hole of the shaft mounted in the sleeve section.

FIG. 2(c) exhibits a third step of the assembling process of the motor, wherein the hub is mounted on the stator.

In FIG. 2(a), the shaft 7 is inserted into the hole 9a of the sleeve section 9 that is formed with the motor base 12 in one piece through the bottom end opening of the hole 9a.

Succeedingly, as shown in FIG. 2(b), the thrust plate 10 is adhered on the bottom end portion of the hole 9a of the sleeve section 9 by the binding agent 11, and then a prescribed amount of the lubricant 21 is injected into the through hole 17 from the top end opening of the through hole 17. Then, the elastic member 18 is press-fitted into the large diameter section 17a of the through hole 17 from the top end opening of the through hole 17 as deep as the elastic member 18 reaches at a predetermined position so as to make the lubricant 21 to be sealed temporally.

After that, leaving the assembled shaft 7 and the sleeve section 9 in a low pressure atmosphere conducts the lubricant 21 to be filled in the gap between the inner wall surface of the hole 9a of the sleeve section 9 and the outer circumferential surface of the shaft 7. By injecting the binding agent 22 into the large diameter section 17a above the elastic member 18, the elastic member 18 is adhered to the inner wall surface of the large diameter section 17a securely, and resulting in sealing the lubricant 21 in the through hole 17 completely (see FIG. 2(b)).

As shown in FIG. 2(c), the coil 14 that is wound around the core 13 is mounted on the sleeve section 9. The lead wire 14a of the coil 14 is passed through the through hole 12b of the motor base 12, and soldered on the FPC 15 so as to be connected to the driving circuit 40 (not shown) of a disc drive apparatus to be described later through the connector 16. The hub 2 is fixed to the top portion of the shaft 7 by force-fitting the hole 2a of the hub 2 to the shaft 7, and resulting in integrating the hub 2 and the shaft 7 as the rotor 4.

Accordingly, the assembling process is completed, and resulting in manufacturing the motor 100 having the dynamic pressure fluid bearing.

According to the assembling process mentioned above, the lubricant 21 never leaks out from the through hole 17 when the lubricant 21 is injected therein, so that an extra process for wiping off leaked lubricant is not necessary. Consequently, the manufacturing process is high in productivity, and resulting in enabling to manufacture motors in lower cost.

Further, providing the large diameter section 17a as against the small diameter section 17b ensures not only giving an indication of an injection amount of the lubricant 21 but also preventing the lubricant 21 from being injected excessively because fluid level in the large diameter section 17a rises more slowly than fluid level in the small diameter section 17b, which rises rapidly, when lubricant 21 is injected into the through hole 17. Consequently, providing the large diameter section 17a is excellent in workability.

[Second Embodiment]

Figure 3:
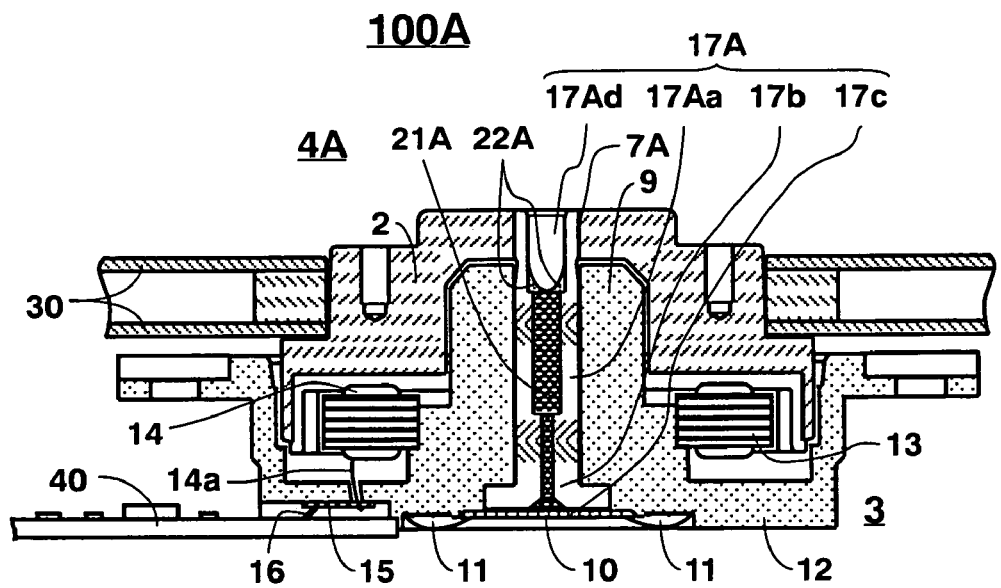
FIG. 3 is a cross sectional view of a motor having a dynamic pressure fluid bearing according to a second embodiment of the present invention.

FIG. 3 is a cross sectional view of a motor having a dynamic pressure fluid bearing according to a second embodiment of the present invention.

In FIG. 3, a motor 100A according to the second embodiment of the present invention is identical to the motor 100 according to the first embodiment except for a shaft 7A. Consequently, the same components as those of the motor 100 are indicated by the same reference sings as those of the motor 100, and their details are omitted.

The motor 100A is composed of the stator 3 and a rotor 4A. The rotor 4A is provided with the shaft 7A of which one end portion is force-fitted into the hole 2a of the hub 2. The shaft 7A is formed with a through hole 17A. The through hole 17A of the shaft 7A according to the second embodiment is different from the through hole 17 of the first embodiment in configurations. As shown in FIG. 3, the through hole 17A is provided with a first large diameter section 17Aa, a second large diameter section 17Ad that is provided above the first large diameter section 17Aa adjacent to a top opening end of the through hole 17A, the small diameter section 17b, and the tapered opening section 17c. A diameter of the second large diameter section 17Ad is larger than that of the first large diameter section 17Aa and enables to be assigned to $\phi$ 3, for example, in case a diameter of the first large diameter section 17Aa is defined to be $\phi$ 2.

Further, in this second embodiment, the elastic member 18 is not utilized. However, lubricant 21A is sealed in the through hole 17A by sealant (binding agent) 22A that is injected into the second large diameter section 17Ad.

With respect to actions of the through hole 17A of the second embodiment and the tapered opening section 17c, further details are described next.

The lubricant 21A filled in the through hole 17A ensures a necessary amount of lubricant for lubricating a dynamic pressure fluid bearing.

The tapered opening section 17c provided on the bottom end surface 7b of the shaft 7A is utilized for conducting bubbles let in the lubricant 21A to the through hole 17A efficiently as well as compensating a necessary amount of the lubricant 21A, wherein the bubbles are let in the lubricant 21A when the lubricant 21A is injected into the through hole 17A, and remain in the gap between the bottom end surface 7b of the shaft 7A and the top surface of the thrust plate 10.

By this configuration, the bubbles that are conducted to the through hole 17A are released from fluid level of the lubricant 21A to outside air, and resulting in being removed from the lubricant 21A. For such occasions, it is necessary for the opening mouth diameter 17e of the tapered opening section 17c to be set as large as possible. However, if the opening mouth diameter 17e is extended excessively more than necessary, an area confronting with the thrust plate 10 reduces as much, and resulting in reducing an area of a dynamic pressure groove.

Accordingly, it is desirable for the opening mouth diameter 17e to be set so as to ensure necessary performances of a thrust dynamic pressure fluid bearing in consideration of the outer diameter of the flange 8. In this case, by setting a range of an area for forming the dynamic pressure groove on the bottom end surface 7b of the flange 8 that confronts with the thrust plate 10 to be larger than the outer diameter of the shaft 7A in response to another range of an area for forming the dynamic pressure groove on the top surface of the flange 8 opposite to the bottom end surface 7b, the opening mouth diameter 17e enables to be enlarged as large as the outer diameter of the shaft 7A is. Enlarging the opening mouth diameter 17e as large as the outer diameter of the shaft 7A is the most desirable configuration. In other words, the opening mouth diameter 17e shall be $\phi$ 4.0 in case the outer diameter of the shaft 7A is defined as $\phi$ 4.0.

Further, it is not necessary for a shape of the tapered opening section 17c to be a conical shape. It is acceptable for a shape of the tapered opening section 17c to be an approximate cone shape of which curvature of a surface is not constant or changes. A cone shape, that is, a shape having chamfered corner in cross section is most desirable for the tapered opening section 17c.

On the other hand, the angle θ of the tapered opening section 17c shown in FIG. 1 is defined as 120 degrees in the first embodiment. However, it should be understood that the angle θ is not limited to 120 degrees. The angle θ of the tapered opening section 17c is desirable to be larger in accordance with thickness of the flange 8 as far as strength of the shaft 7A is not deteriorated.

According to the first and second embodiments of the present invention, as mentioned above, the lubricant 21 or 21A is filled in not only the through hole 17 or 17A but also the gap between the tapered opening section 17c and the thrust plate 10, so that a sufficient amount of the lubricant is always supplied to the thrust and radial dynamic pressure fluid bearing sections.

Accordingly, initial performances enable to be ensured for a long period of time without being affected by lubricant of which amount decreases due to exuding of lubricant diachronically.

In the first and second embodiments of the present invention, it is acceptable that a coefficient of linear expansion of the sleeve section 9 is made smaller than that of the shaft 7 or 7A by selecting their materials as mentioned below.

In this connection, it is realized by forming the sleeve section 9 by an aluminum based material and the shaft 7 or 7A by zinc, wherein the coefficient of linear expansion of aluminum and zinc is $23.2 \times 10^{-6}$/K and $27.0 \times 10^{-6}$/K respectively.

By this configuration, although viscosity of lubricant is degraded at higher temperature, and resulting in deteriorating stiffness of a bearing of the dynamic pressure fluid bearing, the coefficient of linear expansion of the shaft 7 or 7A is larger than that of the sleeve section 9. Therefore, the gap between the inner wall surface of the hole 9a of the sleeve section 9 and the outer circumferential surface of the shaft 7 or 7A is made narrower, and resulting in enabling to cancel deterioration in stiffness of the bearing of the dynamic pressure fluid bearing.

On the other hand, in case of lower temperature, viscosity of lubricant increases, and resulting in increasing load against a bearing. Consequently, driving electric current to be supplied to the motor 100 or 100A increases. However, the coefficient of linear expansion of the shaft 7 or 7A is larger than that of the sleeve section 9. Therefore, the gap between the inner wall surface of the hole 9a of the sleeve section 9 and the outer circumferential surface of the shaft 7 or 7A is made wider, and resulting in enabling to cancel deterioration in stiffness of the bearing of the dynamic pressure fluid bearing.

[Third Embodiment]

Figure 4:
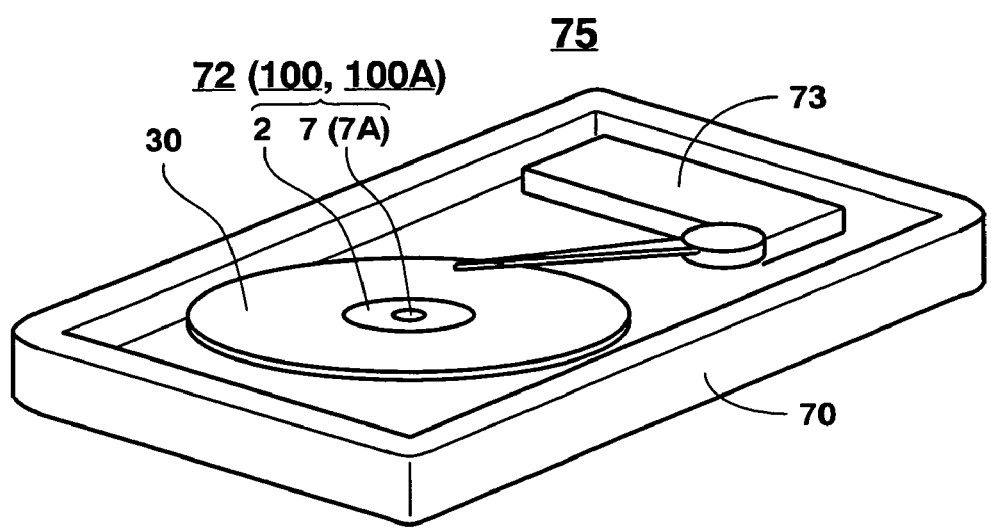
FIG. 4 is a perspective view of a disc drive apparatus mounted with the motor shown in FIG. 1 or FIG. 3 according to a third embodiment of the present invention.

FIG. 4 is a perspective view of a disc drive apparatus that is mounted with the motor shown in FIG. 1 or FIG. 2 according to a third embodiment of the present invention. In FIG. 4, a disc drive apparatus 75 is composed of a chassis 70, a motor 72, and a recording and reproducing device 73 for recording or reproducing information on the disc 30. The motor 72 is mounted with the disc 30 or a recording medium such as a magnetic disc for recording information, wherein the disc 30 is mounted on the hub 2 of the motor 72. In this connection, the motor 100 or 100A having the dynamic pressure fluid bearing according to the first or second embodiment of the present invention is utilized for the motor 72.

According to the present invention, a motor having a dynamic pressure fluid bearing exhibits effects such as long life, easy to assemble, and enabling to achieve performances stably for a long period of time.

Further, a disc drive apparatus provided with the motor having the dynamic pressure fluid bearing as mentioned above is long in life and enables to achieve performances stably for a long period of time.

While the invention has been described above with reference to a specific embodiment thereof, it is apparent that many changes, modifications and variations in configuration, materials and the arrangement of equipment and devices can be made without departing form the invention concept disclosed herein.

Further, it will be apparent to those skilled in the art that various modifications and variations could be made in the motor and the disc drive apparatus field in the present invention without departing from the scope of the invention.

What is claimed is:

1. A motor having a dynamic pressure fluid bearing comprising:
   a hub;
   a rotor provided with a shaft of which one end portion is securely fastened by the hub and another end portion is formed with a flange; and
   a stator composed of a sleeve for axially sustaining the shaft so as to be rotatable freely and a thrust plate secured on the sleeve so as to confront with the flange,
   wherein the dynamic pressure fluid bearing is composed of a thrust dynamic pressure fluid bearing constituted by the flange and the thrust plate, and
   wherein the shaft is provided with a through hole that is bored through the shaft from the one end surface to the other end surface, and
   wherein the through hole is formed in a shape having an opening to the other end surface of the shaft by way of a funnel shaped section of which diameter gradually increases toward the other end surface of the shaft.

2. A disc drive apparatus provided with the motor having a dynamic pressure fluid bearing as claimed in claim 1, wherein the motor is mounted on a disc recording and reproducing apparatus utilized for recording or reproducing information on a recording medium in disciform and for driving the recording medium in disciform rotatably, and
   wherein the recording medium in disciform is secured on the hub of the motor having a dynamic pressure fluid bearing.

* * * * *